(12) United States Patent
Engelmann et al.

(10) Patent No.: US 8,327,986 B2
(45) Date of Patent: Dec. 11, 2012

(54) COMBINED POWER TRANSMISSION, START-UP UNIT AND DRIVE SYSTEM

(75) Inventors: Dominique Engelmann, Offendorf (FR); Mario Degler, Baden-Baden (DE); Bruno Mueller, Sasbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 645 days.

(21) Appl. No.: 12/553,283

(22) Filed: Sep. 3, 2009

(65) Prior Publication Data

US 2010/0062899 A1   Mar. 11, 2010

(30) Foreign Application Priority Data

Sep. 8, 2008 (DE) .................. 10 2008 046 228

(51) Int. Cl.
*F16D 25/12* (2006.01)
*F16D 33/16* (2006.01)
*B60K 6/38* (2007.10)
*B60K 17/02* (2006.01)
*F16D 25/06* (2006.01)

(52) U.S. Cl. .................. 192/3.26; 192/3.29; 192/48.611

(58) Field of Classification Search .................. 192/3.25, 192/3.26, 3.27

See application file for complete search history.

(56) References Cited

U.S. PATENT DOCUMENTS

| 7,017,722 | B2 * | 3/2006 | Leber .......................... | 192/3.27 |
| 7,028,820 | B2 * | 4/2006 | Johann et al. ................ | 192/3.26 |
| 7,044,279 | B2 * | 5/2006 | Leber .......................... | 192/3.25 |
| 7,235,904 | B2 * | 6/2007 | Breier et al. ................. | 310/75 R |
| 7,815,026 | B2 * | 10/2010 | Povirk et al. ................. | 192/3.26 |
| 2006/0289209 | A1 * | 12/2006 | Grosspietsch et al. ....... | 180/65.2 |
| 2008/0023287 | A1 * | 1/2008 | Thiede et al. ................ | 192/48.1 |
| 2009/0054203 | A1 * | 2/2009 | Heeke .......................... | 192/3.29 |

FOREIGN PATENT DOCUMENTS

| DE | 10310831 A1 | 11/2003 |
| DE | 102006040117 A1 | 3/2008 |

* cited by examiner

*Primary Examiner* — David D Le
*Assistant Examiner* — Jacob S Scott
(74) *Attorney, Agent, or Firm* — Simpson & Simpson, PLLC

(57) ABSTRACT

A force transmission device having a hydrodynamic component, disposed between an input and an output, comprising at least a pump shell and a turbine shell, forming an operating cavity in combination, with an actuatable clutch device for at least partially bridging the hydrodynamic component, comprising a clutch component for at least partially bridging the hydrodynamic component, comprising a first clutch component connected with the input and a second clutch component at least indirectly connected to the output, which can be brought into operative engagement with one another through an actuation device, with a vibration absorber disposed in the force flow at least subsequent to the actuatable clutch device, with a housing coupled with the input or with an element coupled non-rotatably to the input and coupled with the pump shell.

18 Claims, 3 Drawing Sheets

COMBINED POWER TRANSMISSION, START-UP UNIT AND DRIVE SYSTEM

CROSS-REFERENCE TO RELATED APPLICATIONS

This patent claims priority of German Patent Application No. 10 2008 046 228.4, filed on Sep. 8, 2008, which application is incorporated herein by reference.

FIELD OF THE INVENTION

The invention relates to a combined power transmission and drive unit for application in hybrid systems, between at least a first engine and an element to be driven, with a power transmission device and a selectable upstream-disposed clutch device for selective disconnection/connection of power flow between at least the first engine and the power transmission device, comprising a first clutch part connectable with the first engine and a second clutch part connected non-rotatably with or partially forming the input of the power transmission device, in that the clutch part is actuated by means of a servo unit activated with hydraulic medium with at least a piston element and at least a chamber, associated with the piston element, which can be pressurized with hydraulic medium.

The invention further relates to a drive system, in particular, a hybrid system with such a combined power transmission and drive unit.

BACKGROUND OF THE INVENTION

Hybrid systems for application in vehicles are anticipated in a number of designs from the prior art. What is common to all such systems is that in the drive train at least two different engines/aggregates are provided, through which the drive can occur selectively or jointly, wherein at least one of the engines is suitable as an engine in a first mode of operation and in a second mode of operation as a machine for converting the braking energy into another form of energy for the purpose of temporary storage and/or for powering other consumers. In the application in vehicles, the first engine is often executed as an internal combustion engine, whereas the second engine is executed as an electric machine that is suitable to feed electric energy into an accumulator whilst in generator operation. Such a hybrid system, for instance, is depicted in the prior publication DE 103 10 831 A1, FIG. 30; this discloses a power transmission device that is disposed between at least two engines and a downstream-disposed consumer in the form of a transmission. For full decoupling of the first engine from the drive train, a device for disconnection/connection of the power flow is provided at least between this and the power transmission device, which is executed in the form of a selectable clutch device, which is designated also as engine clutch or separating clutch. The second engine is designed as an electric machine by which the armature is connected non-rotatably with the power transmission unit. The power transmission device comprises at least a start-up element, preferably a hydrodynamic component, and in this case, it comprises a device at least for partially bypassing the power flow by means of the hydrodynamic component. The downstream-disposed transmission that is generally executed as manual-shift transmission is characterized by a plurality of hydraulic-medium-actuated shifting elements. To guarantee the hydraulic medium supply for the power transmission device and transmission shifting elements, appropriate operating-and-control fluids supply and/or guidance system is provided, comprising at least a hydraulic circulation system in which the required operating fluid with appropriate pressure is supplied by means of a pumping device in the form of a so-called transmission oil pump. The transmission oil pump is furthermore required for the operation of separation and/or start-up clutch/clutches. For this, the transmission oil pump for safe operation is preferably connected directly with the input of the power transmission device. This coupling allows driving in different modes of operation of the drive train by means of the first and/or second engine.

The following modes of operation are differentiated in traction operation as possible basic modes of operation of such a drive train and can be modified by further subsidiary modes of operation. First, driving, particularly powered driving with power flow from the first engine, in particular internal combustion engine with a closed device for disconnection/connection of the power flow between at least the first engine and the power transmission device, in particular by means of a first and/or second power branch of the power transmission device. Second, driving, particularly electric driving with power flow from the second engine, in particular electric machine, by means of a first and/or second branch of the power transmission device with an opened/closed device for disconnection/connection of the power flow between at least the first engine and the power transmission device.

The emergency operation is characterized by exclusive operation of the first engine that is started by means of its own starting motor.

A critical disadvantage of such a system is that in conventional hydraulic systems used for this purpose while the vehicle is stationary, for instance during short standstill, the transmission oil pump can run empty due to drive outage. When starting up anew, first the hydraulic supply and hence the transmission oil pump must be driven, which again must provide sufficient pressure and volumetric flow so that the required servo units to be pressurized and the hydrodynamic component are filled as well. Since this leads to substantial delays in the reaction to the accelerator actuation, which under certain circumstances in a variety of situations also poses a significant safety risk, the possibility exists that, also in a stationary vehicle, the hydraulic system of the transmission must be kept filled with low-pressure hydraulic media volume. The transmission oil pump being used must be able to replenish, in particular, the leakages of the hydraulic system while the vehicle is stationary. To guarantee this, an additional electrically driven oil pump is often used in the prior art. Alternatively, the electric machine of the hybrid system and the already existing main transmission oil pump is used, which is associated with technical disadvantages. Thus, an additionally provided and electrically driven oil pump entails extra expenses. On the other hand, not using such an ancillary pump is also characterized by a plurality of disadvantages. If the clutch device is open in the pressure-less state, in one of such embodiments, the emergency operation characteristics are no longer guaranteed. Even when the internal combustion engine is started by means of an ancillary starter motor, no oil pressure can be developed inside the transmission, since the pressure-less open-clutch device cannot be closed so that the transmission oil pump is driven. If the mode of operation of the transmission, for instance, is disturbed owing to a control error and must be operated in an emergency mode, then even an existing electric ancillary pump cannot be used, since it is also activated by the transmission control system.

Furthermore, it is required in the "electric driving" state that the selectable clutch device between at least the first engine and the power transmission device is fully open, in order to avoid drag losses through the elements carrying and/or forming frictional surfaces that rotate relative to one another. In the process, in this operating range in most cases, the required minimum pressure for fully opening the clutch is not at disposal. The use of a pressure-less closed-clutch requires very high-pressure levels for opening, whilst in the electric driving mode. This reduces the efficiency of the entire system.

A further combined power transmission and drive unit according to the prior art is known, for instance, from the German patent application DE 10 2006 040 117 A1. The hybrid drive unit described therein comprises at least one, preferably two, selectable clutch devices, of which one acts as a separating clutch and the other as a start-up clutch.

Therefore, there has been a long felt need in the art to provide and configure a drive train for a combined power transmission and drive unit for the application in a hybrid system of the type mentioned above such that it is additionally suitable, based on possibility, for the already available and required transmission oil pump, free of an ancillary pump, to avoid the disadvantages mentioned above. In this way, the solution according to the invention shall be characterized above all by emergency operation properties, in which the selectable clutch device transmits torque during an emergency operation and further enables smooth opening of the selectable clutch device during electric driving.

SUMMARY OF THE INVENTION

The present invention comprises a combined power transmission and drive unit for the application in hybrid systems between at least a first engine and an element to be driven, for instance, a transmission and a drive train adjoining it in power flow, a power transmission device at least featuring or forming a start-up element and an upstream-disposed selectable clutch device for selective disconnection/connection of the power flow at least between the first engine and the power transmission device, comprising a first clutch part connectable with the first engine and a second clutch part connectable with the input of the power transmission device, i.e., connected non-rotatably with or forming this clutch part, with the hydraulic medium-activated servo unit with at least a piston element and a chamber associated with the piston element that can be pressurized with hydraulic medium, according to a first embodiment of the invention, characterized in that the chamber that can be pressurized with hydraulic medium is disposed and executed such that it rotates with the rotation speed of the first clutch part or an element that is connected non-rotatably with the latter, in particular with the rotation speed of a directly connected element.

"Pressurized with hydraulic medium" in the sense of the invention means that a flow medium, in particular fluid with pressure can be supplied to and drained from the chambers/voids. "Pressurized actuation" means that an actuating force is generated by means of pressure in a particular flow medium. The flow media acting as hydraulic medium are incompressible media, in particular oil.

The solution according to the invention and inside a chamber associated with the piston element that can be pressurized with a hydraulic medium, in short, designated piston chamber by which the rotation adjusts an actuating pressure automatically on the piston element and thus exerts a contact force owing to the centrifugal force of operating media masses rotating in unison with the latter hence leading to an active connection between individual clutch parts. The automatic adjustment causes flawless actuation of the selectable clutch device, which above all, is independent of the pressure in an operating medium supply and guidance system associated with the piston chamber and hence with the transmission of torque by means of the latter to the drive of the transmission oil pump connected with the input of the power transmission device. An ancillary pump that is difficult to dispose and control can be omitted and the transmission oil pump can always be driven during the operation of the first engine.

The magnitude of the actuating force generated by the centrifugal force, or rather the contact force is thereby determined at least as a function of the rotation speed of the first clutch part and hence of the first engine connected with the latter, of the operating media quantity in the piston chamber and the magnitude of the piston surface, which is pressurized with the centrifugal oil pressure. The resulting contact force is determined by the contact force caused by the centrifugal force and the counteracting forces on the piston element, in particular of the forces determined by the pressure in the clutch surrounding and acting on the piston element.

The piston chamber is preferably disposed and dimensioned such that with a predefined and in general also retained minimum filling quantity, in the non-operational state of a hybrid system, through the effect of centrifugal force at minimum rotation speed of the piston chamber, which corresponds to the minimum rotation speed of the first engine, by considering further transmission and conversion units between a first engine and first clutch part, an actuating force acts on the selectable clutch device, which is suitable at least to transmit predefined minimum torque. In this way, the already existing selectable clutch device is used at least partially for power transmission and the means of transmission of minimum torque are integrated in a space-saving manner in the required mounting space.

Since, in such drive trains, the input of power transmission unit is generally connected with a second engine and a pumping device for operation and control media of a supply and guidance system, the predefined minimum torque is dimensioned such that it is sufficient in any case to drive the pumping device, in particular the transmission oil pump connected with the input of the power transmission device. The magnitude of the predefined minimum torque is determined such that the latter is suitable for driving at least the pumping device and, if necessary, also the second engine. The design is preferably at least based on the transmittable minimum torque ranging from 3 to 80 Nm, preferably 3 to 30 Nm, especially preferably 3 to 20 Nm.

Through the required transmittable minimum torque, one can dispense with an additional pump and a drive system associated with this in the operating media supply and guidance system and possibly an ancillary tank. The entire operation and control media provision takes place by means of a single pumping device, through which, besides omission of the ancillary pump, also the arrangement of lines and their connections can be optimized. In a further improvement, the piston chamber design can be such that also transmittable minimum torque is higher, for instance, that the entire engine torque is transmittable.

The design version can be implemented in different ways. Common to all embodiments is that the chamber that can be pressurized at least indirectly with hydraulic medium, i.e., either directly or by means of further transmission elements, is connected non-rotatably with the first clutch part. Through the coupling of the chamber pressurized with hydraulic medium, forced coupling is generated with the first clutch part, which guarantees that the rotation speed is synchronized.

In a particularly advantageous and space-saving embodiment, the chamber that can be pressurized with hydraulic medium is formed by exploiting the piston element directly by the latter and the first clutch part and/or an element connected non-rotatably with the latter, wherein the piston element is guided and/or supported in a slidable manner in the axial direction, in a pressure- and liquid-tight manner, on the first clutch part and/or guided on an element connected non-rotatably with the latter. To prevent relative movements between the individual walls demarcating the piston chamber, in circumferential direction, and hence influencing the operating media ring that rotates in unison and adjusting in the piston chamber, the piston element is connected non-rotatably with the first clutch part in circumferential direction or with an element connected non-rotatably with the latter. The connection is force- or form-closed. Preferably, the connection is established and disposed such that it also allows axial sliding, of the piston element, relative to the first clutch part. In this way, the individual functions are disposed and implemented in the smallest space possible.

The selectable clutch device, in the first embodiment, is executed preferably in disc design, in particular as a frictional multi-disc clutch. The individual clutch parts comprise, in this case, at least a carrier and at least a frictional-surface-carrying and/or frictional-surface-forming element guided in a slidable manner on the latter. In order to provide large, effective piston surfaces for generating a contact force, the first clutch part comprises an external disc carrier, on whose internal circumference the piston element is guided axially in a slidable and pressure-tight manner. To facilitate easy assembly and application of standardized units, the embodiment of the first clutch part is preferably implemented in several parts, wherein the individual components are connected non-rotatably with one another, preferably form-closed. The piston element is preferably connected non-rotatably to a hub with the first clutch part in the area of its internal circumference and guided in a slidable manner in the axial direction. The second clutch part in this case comprises a carrier in form of an inner disc carrier.

The inner disc carrier is connected non-rotatably with or forms the input of the power transmission device.

The piston chamber is disposed variably in the axial direction within the combined power transmission and drive unit. In a first embodiment variant, the chamber that can be pressurized with the hydraulic medium in the axial direction is disposed between the first engine and the power transmission device, between clutch parts of the selectable clutch device and the power transmission device. This solution has the advantage, in particular when fluid flow connection is desired between clutch surrounding and the pressure chamber of the power transmission device, in which case, the partition wall between them can be omitted and both power transmission device and selectable clutch device being enclosed in an internal chamber by common housing in a particularly space-saving manner, in the axial direction, can be omitted by minimizing the required number of connections to the pressure chambers.

In a second variant, the chamber being pressurized with the hydraulic medium in the axial direction is connected upstream of the clutch parts of the selectable clutch device.

In an advantageous further improvement, a pre-stressing force device is disposed between the piston element and the first clutch part. This comprises at least a spring unit that is hung elastically, in the axial direction, between the first clutch part and piston element. The pre-stressing force is used, advantageously for additional generation of minimum actuating force, independently of the drive by means of the first engine. The spring unit is connected in series with the piston chamber, with regard to its manner of action.

The combined power transmission and drive unit, for the application in hybrid systems, between at least a first engine and an element to be driven, for instance, a transmission and a drive train adjoining the latter in power flow, with at least a power transmission device featuring or forming a start-up element and an upstream selectable clutch device for selective disconnection/connection of the power flow between the first engine and the power transmission device, comprising a first clutch part connectable with the first engine and a second clutch part connectable with the input of the power transmission device, which can be actuated by a hydraulic-medium-activated servo unit with at least a piston element, according to a further second alternative embodiment according to the invention is characterized in that the means of transmission of a predefined torque between the first engine and the power transmission unit are provided, which are executed and disposed such that they are suitable for transmitting the full torque that can be developed by the first engine when driven by the latter.

The means of transmission of the predefined torque comprises a device for developing a predefined preload on the servo unit of the selectable clutch device, wherein the preload is dimensioned such that it corresponds to an actuating force of the piston element for developing the torque developed by the first engine. The selectable clutch device is hence "connected pressure-less," i.e., to close the clutch and transmit the torque, it is not necessary to pressurize the piston element with hydraulic medium.

Through transmission of full engine torque, the pumping device, in particular the transmission oil pump connected with the input of the power transmission device is driven. An additional pump and a drive system in the operating medium supply associated with the latter and the guidance system and possibly an ancillary tank can be dispensed with. The entire operation and control media is supplied by means of a single pumping device, through which, besides omission of the ancillary pump, also the disposition of lines and line connections can be optimized.

The device for developing the preload comprises at least a pre-stressing element, especially a spring device, depending on the disposition and allocation of the servo unit at least a diaphragm spring or a compression spring or tension spring device, which preferably and directly pressurizes the servo unit of the selectable clutch device. The pre-stressing element is preferably disposed between the servo unit of the selectable clutch device and one of the clutch parts, preferably the second clutch part or the connection of the second clutch part with the input of the power transmission device, the input of the power transmission device or with an element connected non-rotatably with the latter, in particular a housing wall.

In the embodiment according to the second solution, the power flow occurs between the first engine and the power transmission device, free of pressurized actuation of the piston element. In addition, it can be made possible that actuation in this operating range is assisted by hydraulic medium.

In both embodiments according to the invention, it has to be ensured, when driving by means of a second engine coupled with the power transmission device, that the selectable clutch device is fully open to prevent drag losses. This occurs by pressurizing the piston element against the actuating force for closure. The required force is preferably provided by means of the operating medium supply and guidance system of the combined power transmission and drive unit, in that the internal chamber forming the clutch surrounding is coupled in fluid-flow terms with at least an internal chamber of the power transmission device, preferably, enclosing the hydrodynamic component and preferably subjected to pressure inside the latter.

The power transmission unit can be formed in different manners. This comprises preferably a converter in form of a hydrodynamic component and a further selectable clutch device in the surrounding of the power flow by means of the hydrodynamic component, wherein the latter is assigned to an operating medium supply and guidance system. The operating medium supply and guidance system comprises at least a feed with a pumping device integrated in the latter, in particular the transmission oil pump, a runback and lines and ducts for conveying the operating medium by means of the power transmission device between at least two connections that are selectively at least respectively connectable with the outlet or inlet, wherein a first connection is connected with work chamber of the hydrodynamic component and a second connection with the internal chamber, in particular an interstice between the servo unit of the clutch device for bypassing the hydrodynamic component and housing. In this way, according to an advantageous further improvement, at least the connection for the pressure chamber, of the servo unit of the engine or rather separating clutch, pressurized with hydraulic medium is connectable with the inlet of the operating medium supply and guidance system for the power transmission unit. In this way, it is ensured that, with increasing pressure in the system, the same is exerted also on the engine clutch and the actuating force is developed through the pressure in the pressure chamber.

The force required for opening the selectable clutch device is preferably, likewise, provided by means of the operating medium supply and guidance system of the combined power transmission and drive unit, in that the internal chamber forming the clutch surrounding in fluid-flow terms is coupled with at least, preferably the internal chamber of the power transmission device enclosing the hydrodynamic component.

The solution according to the invention is suitable for the application in hybrid systems in a particularly advantageous manner, of which the first engine is formed by an internal combustion engine and its second engine is formed by an electric machine that can be operated as both motor and generator. Other drive concepts for connection of the first and/or second engines are likewise possible.

BRIEF DESCRIPTION OF THE DRAWINGS

The solution according to the invention is subsequently described with reference to figures, wherein.

DETAILED DESCRIPTION OF THE INVENTION

Figure 1:
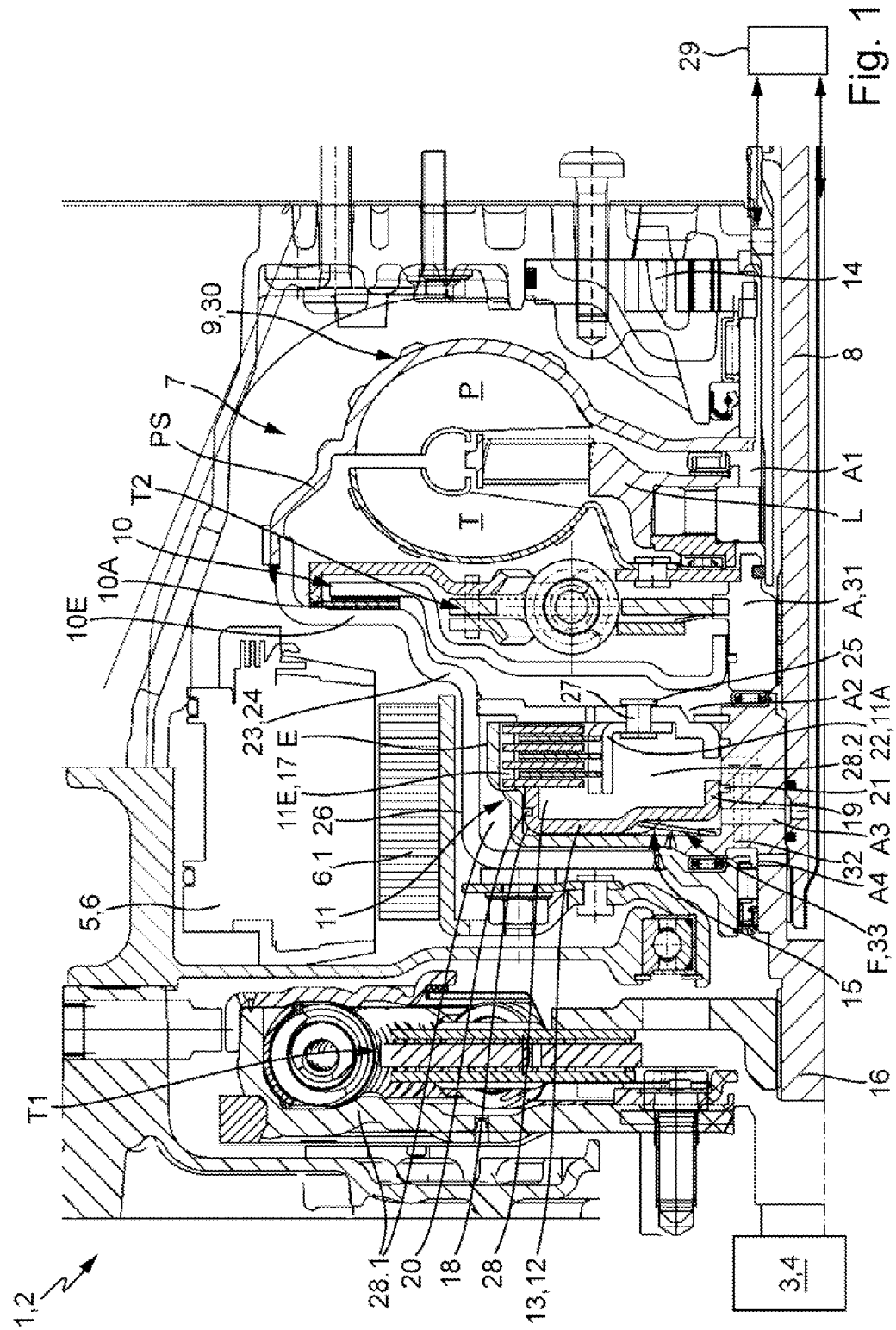
FIG. 1 illustrates a first variant according to the first embodiment of the solution according to the invention with reference to a detail of an axial sectional view of a combined power transmission and drive unit with a centrifugal-force-actuated selectable clutch device.

FIG. 1 clarifies, in an axial section, a first variant of a first embodiment of power transmission and drive unit 1 according to the invention for the application in hybrid system 2. Such hybrid systems find application in a particularly advantageous manner in drive trains of vehicles. This comprises at least first engine 3 that is preferably in the form of internal combustion engine 4 and further second engine 5, which is designed such that it is suitable, at least in the deceleration mode and also in the braking mode, to convert the mechanical energy in the drive train into a different energy form. Second engine 5 as electric machine 6 with armature 6.1 is operable in a particularly advantageous manner as a motor and generator. The coupling of individual engines 3 and 5 with further transmission units in the drive train, for instance a transmission that is not depicted, in this case, occurs by means of power transmission device 7. Power transmission device 7 comprises engine 3 or 5 with the respective, in particular armature 6.1 connectable with input E, at least output A connected with further transmission units, in particular the transmission that is not depicted in this case, in detail and at least start-up element 30. Output A of power transmission device 7 is formed thereby either directly by transmission input shaft 8 or connected at least non-rotatably with the latter. In the depicted case, the coupling occurs with transmission input shaft 8 by means of hub 31. Start-up element 30 in the depicted case is executed in a particularly advantageous embodiment as hydrodynamic component 9. This comprises at least a primary wheel acting as impeller P, in the power flow viewed from input E to output A of power transmission device 7 and a secondary wheel acting as turbine wheel T, and further in the embodiment as converter at least stator L. Impeller P is coupled mechanically with input E of power transmission device 3, or it forms with the latter assembly unit. Turbine wheel T is connected at least indirectly, which means directly or by means of further transmission elements, in this case, for example, device T2 for damping vibrations, with output A of power transmission device 7. Coupling occurs by means of hub 31 in the form of a damper hub. Power transmission device 7 further comprises selectable clutch device 10 in the surrounding of hydrodynamic component 9, in the power flow between respective engine 3, 5 and further transmission units, in particular the transmission to facilitate the use of hydrodynamic component 9 solely in the high efficiency range, interacting with respective engine 3 or 5 and to bypass the latter in uneconomical operation ranges. In general, such selectable clutch devices 10 are executed in the form of force-closed clutches, preferably in the form of multi-disc clutches comprising first clutch part 10E at least indirectly connected with input E of power transmission device 7 and second clutch part 10A with output A at least indirectly, in this case connected with device T2 for damping vibrations. Other embodiments, for instance in the form of synchronously selectable clutches, are likewise considerable.

The power flow can be guided respectively by one of engines 3 or 5 alone by means of power transmission device 7 or starting from both engines 3 and 5 when operated in parallel. Electric machine 6 is thereby operable at least as a motor, preferably also as a generator. Depending on the mode of operation of electric machine 6, different functions are possible, wherein, in the motor-drive operation, the function as starter generator or the power feed function for first engine 3 is realized additionally, whereas in the braking or deceleration mode, electric machine 6 is operated preferably as a generator and power from the mechanical energy is converted into electric energy and can be fed in accumulator or consumer mains.

In order to facilitate sole power transmission from second engine 5 to the rest drive train or, in the deceleration mode, to be able to convert and save a high proportion of the mechanical energy in electric energy, a device for selective disconnection/connection of the power flow between engine 3 and power transmission device 7 is provided between first engine 3 and power transmission device 7, which is preferably executed as selectable clutch device 11. Selectable clutch device 11 is, in a particularly advantageous manner, executed as a frictional clutch device in the form of a wet clutch. This is also designated as engine clutch. Selectable clutch device 11 comprises at least first clutch part 11E and second clutch part 11A, which can be brought in active connection at least indirectly by means of servo unit 12, wherein first clutch part 11E is connected at least indirectly non-rotatably with first engine 3 and second clutch part 11A at least indirectly non-rotatably with input E of power transmission device 7. At least indirectly, in this connection means, coupling can occur directly or by means of a further transmission element, in this case, for instance, device T1 for damping vibrations, as an elastic clutch between first engine 3 and power transmission device 7. Individual clutch parts 11E and 11A in the force-closed clutch in a multi-disc embodiment comprise respectively at least a frictional surface carrying and/or frictional surface forming element(s), which are supported on appropriate carriers, in a slidable manner, in the axial direction. In the embodiment as multi-disc clutch, the fiction surfaces are either directly formed by surface areas of individual discs or formed as ancillary lining or coating provided on individual discs. The active connection between the individual elements carrying and/or forming frictional surfaces of individual clutch parts 11E, 11A is generated by means of servo unit 12, wherein this acts as device for developing the required contact force for the force closure. Servo unit 12 can be actuated by means of hydraulic medium. This comprises, in general, at least piston element 13 that is characterized by at least two basic function positions that are designated as the so-called open-end-position and close-end position of the piston element and which respectively correspond with the function state "Open" and "Closed," i.e., the development of a force-closure for torque transmission or non-selectable clutch device 11 correspond. "Pressurized actuation" means at least an actuation of piston element 13 by means of an active force due to the effect of a hydraulic medium on at least a surface area of the piston surface. For this, a chamber pressurized with the hydraulic medium, which is designated also as piston chamber 15 is assigned to piston element 13. Selectable clutch device 11 in the closed state, which can be described by the force-closure between the individual elements carrying and/or forming frictional surfaces, drives operating fluid-pumping device 14 coupled with input E of power transmission device 7. This provides the required volumetric flow and pressure levels for activation/deactivation of different individual conversion ranges covering the gear steps of a transmission disposed downstream of power transmission device 7. Furthermore, also hydrodynamic component 9 of power transmission device 7 is provided with operating fluid by means of operating medium supply and/or guidance system 29, which is not depicted in detail in this case, and selectable clutch device 11 is actuated. The operating medium finding application is general oil. Pumping device 14 is provided for pumping the medium into individual chambers and pressure chambers for pressurizing the servo element, the shifting elements of the transmission, hydrodynamic component 9 and selectable clutch devices 10 and 11. In the basic function "Open" position of selectable clutch device 11, in which the drive train is separated from first engine 3, selectable clutch device 11 is not actuated. In order to immediately provide the required pressure for hydrodynamic component 9 when starting up during the initial operation of first engine 3 and servo units of the transmission shifting elements and also of selectable clutch device 11 to close the latter, pumping device 14, in the form of the transmission oil pump, must be driven immediately. This is in particular the case, in the emergency operation and after failure of the transmission control, in which driving occurs by means of first engine 3 that is started by means of its own starter motor. In order to be able to drive also in this operating state, the transmission oil pump, in the form of pumping device 14, is provided according to the invention such that selectable clutch device 11 is executed and disposed in particular as servo unit 12 such that the latter closes automatically when driven by first engine 3. This is achieved according to the invention by the centrifugal oil pressure adjusting in piston chamber 15 that is pressurized with hydraulic medium and associated with piston element 13. This is achieved in that piston chamber 15 is driven by engine 3 associated with pressure element 13 of servo unit 12 for pressurizing with the required actuating force and pressurized with hydraulic medium and the operating or rather hydraulic medium inside the latter is dimensioned such that the centrifugal oil pressure forming through the effect of centrifugal force is sufficient in order to bring piston element 13 in the close-end position and hence to close selectable clutch device 11. However, this requires on the one hand that piston chamber 15 that can be pressurized by hydraulic medium must be characterized by a minimum filling level in all function states and does not run completely empty and furthermore is coupled non-rotatably with first engine 3 at least indirectly, preferably directly. This is achieved according to the embodiment depicted in FIG. 1, in that piston chamber 15 is formed through the pressure and liquid tight guidance of piston element 13 on first clutch part 11E or an element connected non-rotatably with the latter. Piston chamber 15 is hence formed and confined by clutch part 11E and piston element 13, wherein piston element 13 acts as a slidable wall of piston chamber 15. There are a plurality of possibilities with regard to concrete disposition and embodiment. In FIG. 1, piston chamber 15 and hence piston element 13 is disposed upstream of individual clutch parts 11E and 11A in the axial direction, viewed from first engine 3 for power transmission device 7. Piston chamber 15 is formed by elements that rotate preferably with the rotation speed of first engine 3 or at least in a ratio to the engine speed. In the depicted case, piston hub 16 is involved, which is coupled non-rotatably with first engine 3 by means of device T1 for damping vibrations. Piston hub 16 is moreover connected non-rotatably with first clutch part 11E in the form of external disc carrier 17, for instance by means of a form-closed connection. The guide of piston element 13 is in the axial direction forming piston chamber 15 in the area of external circumference 18 on external disc carrier 17 of first clutch part 11E and in the area of internal circumference 19 on piston hub 16, in particular a section of piston hub 16 inscribing external circumference 18. For pressure and liquid-tight guide, first sealing devices 20 are provided between external circumference 18 of piston element 13 and first clutch part 11, whereas between internal circumference 19 and piston hub 16 further second sealing device 21 is disposed. Preferably, piston element 13 is furthermore connected non-rotatably with first clutch part 11E or an element connected non-rotatably with the latter, for instance, piston hub 16. Second clutch part 11A in the depicted case comprises inner disc carrier 22 with appropriate internal discs, wherein the disc is connected non-rotatably with input E of power transmission device 7. Input E of power transmission device 7, in the depicted case, is formed by housing 23, wherein, the latter consists of housing bell 24 that, in the depicted case, is connected non-rotatably with impeller P, in particular impeller shell PS and encloses turbine wheel T by forming axial interstice 25 for accommodating selectable clutch device 10.

Selectable clutch device 11 with servo unit 12 is enclosed inside housing 26 that inscribes internal chamber 28, which is also designated as clutch surrounding. In this way, housing 26 can be connected non-rotatably with housing bell 24 or in a particularly advantageous embodiment; it can form an assembly unit with the latter, wherein the housing for combined power transmission and drive unit 1 then encloses power transmission device 7 and selectable clutch device 11 as a single piece. In the depicted embodiment, housing bell 24 that is machined by stamping press as a deep-drawn and formed element, in the axial direction, is formed as a bell that also encloses selectable clutch device 11. The confinement of individual pressure chambers by selectable clutch device 11, in particular the clutch surrounding friction internal chamber 28 and piston chamber 15 as well as power transmission device 7, is established preferably by means of wall elements 27 partitioning the pressure chamber, which are connected non-rotatably with housing bell 24. Other embodiments are considerable. For example, housing bell 24 can also be formed such that they form the axial confinement wall for friction internal chamber 28 of selectable clutch device 11, which forms the clutch surrounding for the latter, in particular the individual elements carrying and/or forming the frictional surfaces. Housing 26 is then connected with the latter non-rotatably, preferably form-closed by means of welding.

In the emergency operation, which means driving by means of first engine 3, a corresponding centrifugal oil pressure will be developed, which causes motion of piston element 13 in the closed-end position, owing to the rotation of piston element 13 in housing 26 that is still stationary in this case. In this way, a frictional contact is generated between the elements carrying and/or forming frictional surfaces of individual clutch parts 11E and 11A and input E of power transmission device 7 is driven, wherein, at the same time, pumping device 14 is likewise driven, and can develop the required pressure levels. With increasing pressure in hydrodynamic component 9, the latter transmits torque to transmission input shaft 8. Furthermore, at the same time, the pressure in piston chamber 15 will be developed by pumping device 14, in order to keep piston element 13 in the closed-end position and hence selectable clutch device 11 in the function state "Closed". Piston chamber 15 is provided with connection A3, through which it can be fed with hydraulic medium. To open selectable clutch device 11, it is then required to apply pressure to pressure element 13, which is greater than the pressure in piston chamber 15, in clutch surrounding friction internal chamber 28. For this, connection A4 must be assigned to clutch surrounding or rather to friction internal chamber 28 forming the latter, through which friction internal chamber 28 forming the latter can be subjected to pressure in the clutch surrounding. In the depicted case, connection A4 is designed such that it extends to interstice 25 as partial chamber 28.1 of friction internal chamber 28 formed between the internal circumference 19 of housing 26 and the external circumference 18 of first clutch part 11E, in particular of external disc carrier 17 and moreover converges into branch 32 at the same time on piston side part 28.2 of internal chamber 28, which is formed by wall element 27 connected non-rotatably with housing bell 24 and piston element 13. In this way, it is possible to guarantee the same pressure ratios through the entire clutch surrounding. Connection A4 is connectable in a particularly advantageous manner and for connecting the cooler of selectable clutch device 11 with pressure for power transmission device 7, in particular component 9.

Power transmission device 7, in the depicted case, is executed as a dual channel unit, comprising two connections, first connection A1 that is coupled with the work chamber of hydrodynamic component 9 and second connection A2 that is connected with interstice 25 disposed between selectable clutch device 10 and wall element 27. An embodiment as a triple-channel unit would also be possible, in which selectable clutch device 10 can be pressurized with hydraulic medium for bypassing hydrodynamic component 9 arbitrarily as required, independently of the remaining ratios in power transmission device 7. In this case, a separate space that can be pressurized with hydraulic medium and that is associated with piston element 13 of servo unit 12 of selectable clutch device 10 would be provided. The individual connections A1 to A4 are preferably at least indirectly connected with common operating medium supply and/or guidance system 29, wherein, in this case, the supply is by means of pumping device 14. In this way, for power flow by means of hydrodynamic component 9, also the clutch surrounding or rather friction internal chamber 28 forming the same in individual partial chambers 28.1, 28.2 is accordingly supplied with cooling medium. This is preferably implemented through the coupling of connection A4 of the clutch surrounding with one of the pressure chambers, preferably connection A2 of power transmission device 7.

Preferably, connection A3 can be coupled with pumping device 14 directly or together with connection A1. Through increased pressure in the converter, also the pressure in piston chamber 15 that can be pressurized with hydraulic medium is simultaneously increased so that the actuating force is now no longer generated alone by means of the centrifugal oil pressure.

In order to be able to open selectable clutch device 11, it is required that the pressure in piston chamber 15 is lowered so far or rather to increase the pressure in the clutch surrounding so far, in particular in friction internal chamber 28 such that it is sufficient to bring piston element 13 in the open position. Preferably, this occurs by means of the pressure in power transmission device 7, in particular hydrodynamic component 9, by coupling connection A4 of the clutch surrounding with connection A1 or A2 of power transmission device 7, wherein both are coupled with pumping device 14. In this way, such quantity of operating medium always remains inside piston chamber 15 so that it is suitable, when starting first engine 3, to exert the required centrifugal oil pressure on piston element 13, which leads to the closure of selectable clutch device 11. The contact force resulting from the centrifugal oil pressure is therefore describable as a function of rotation speed of piston chamber 15, the operating medium quantity inside piston chamber 15 and the surface of piston element 13, which can be thus pressurized.

In the embodiment depicted in FIG. 1 moreover device 33 for developing a preload on piston element 13 is optionally disposed between first clutch part 11E and piston element 13. This, in the depicted case, comprises at least spring unit F that pressurizes piston element 13 with a definite basic actuating force independently of the actual pressure ratios in piston chamber 15. Device 33 and selectable clutch device 11 are connected in series and the pre-stressing force is preferably unidirectional for the actuating force when closing selectable clutch device 11. Spring unit F is optional. This can be executed as tension-, or compression- or diaphragm-spring based on embodiment and connection. In this way, one of individual spring units F can comprise one or several spring elements connected in series or parallel. In the depicted case, spring unit F is disposed between pressure element 13 and first clutch part 11E and connected with the latter by means of form-closure, in particular it is hung in the latter.

Figure 2:
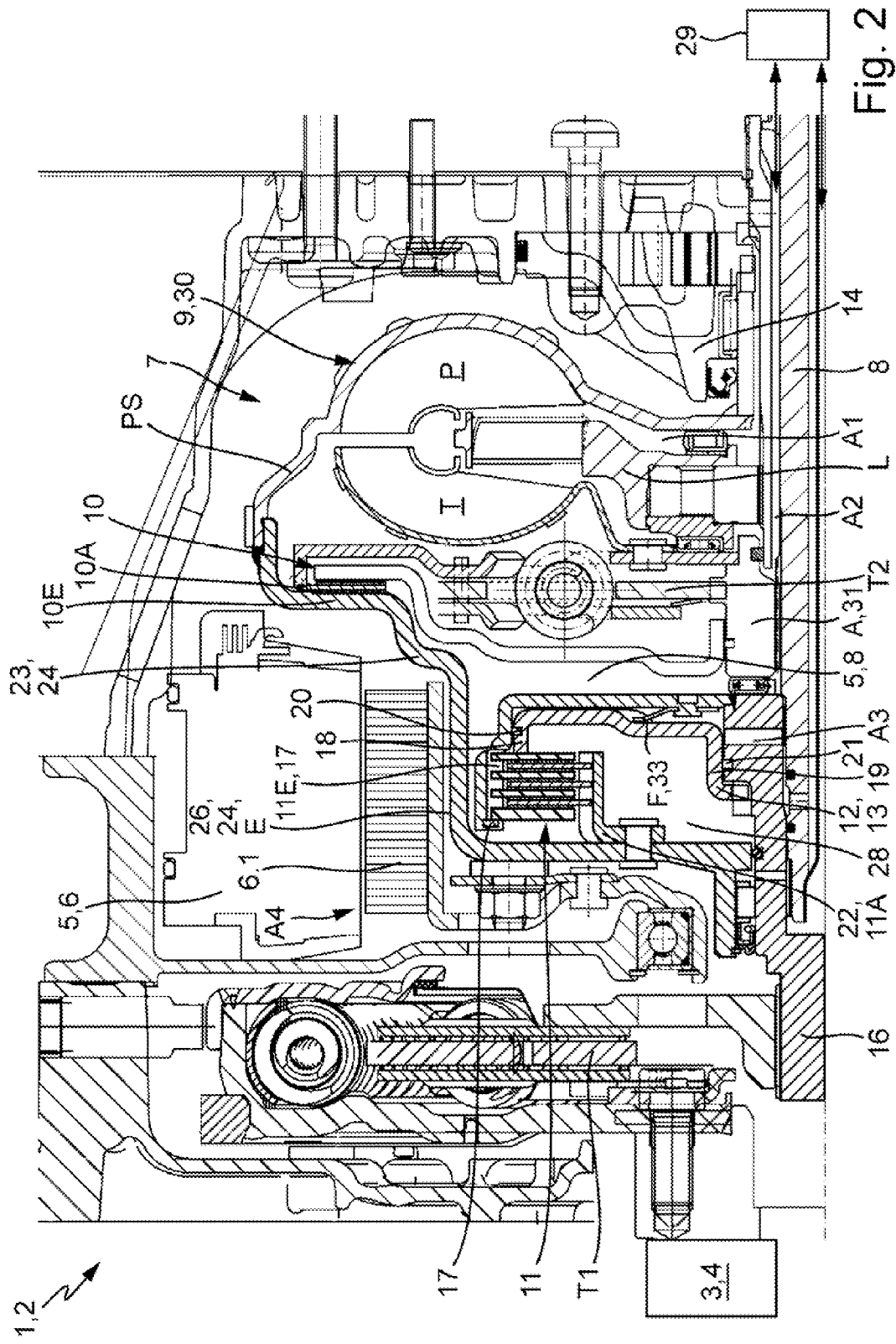
FIG. 2 illustrates a second variant according to the first solution according to the invention with reference to a detail of an axial sectional view of a combined power transmission and drive unit with a selectable clutch device actuated by centrifugal force; and, FIG. 3 illustrates the second embodiment of the solution according to the invention with reference to a detail of an axial sectional view of a combined power transmission and drive unit according to the invention with a selectable clutch device actuated without pressure.

FIG. 1 clarifies an embodiment with piston element 13 disposed in the axial direction on the engine side; FIG. 2 clarifies an alternative embodiment of the first solution with servo unit 12 for actuation of selectable clutch device 11 disposed on the power transmission device side. In this case, for example, first clutch part 11E is formed by external disc carrier 17, in order to achieve appropriately large piston surfaces for piston element 13. Here also, piston element 13 is non-rotatably coupled with the element coupled to the latter, in particular, it is guided in the axial direction in a slidable manner inside piston hub 16. Further, there is a non-rotatable connection between piston element 13 and piston hub 16, which at the same time, forms the input hub. In the depicted case, for example, this is implemented by means of a form-closure or a force-closure. Here, second clutch part 11A comprises internal disc carrier 22 that is connected non-rotatably with input E of power transmission device 7. Only the disposition was reversed. In this way, the pressure chamber partition between selectable clutch device 11 and power transmission device 7 can be dispensed with, nonetheless, in a particularly advantageous manner. Housing bell 24 encloses selectable clutch device 10, selectable clutch device 11 and friction internal chamber 28 that forms the clutch surrounding, formed in this case by interstice 25, so that, in this same ratio, the predominance and an additional coupling or rather fluid-flow connection for developing a cooling oil flow for selectable clutch devices 10 and 11 can be dispensed with. The pressure and liquid tight sealing of piston chamber 15 occurs in analogy to the embodiment depicted in FIG. 1. Power transmission device 7 is characterized in this case, through connections A1 and A2, wherein connection A2 is concurrently assigned also to friction internal chamber 28. Connection A3 is assigned to piston chamber 15. Connection A4 is omitted, as already explained.

This solution depicts a particularly advantageous embodiment, since in this case; the assembly space in the axial direction can be used in an optimal manner, in particular through the omission of wall element 27 limiting friction internal chamber 28.

Figure 3:
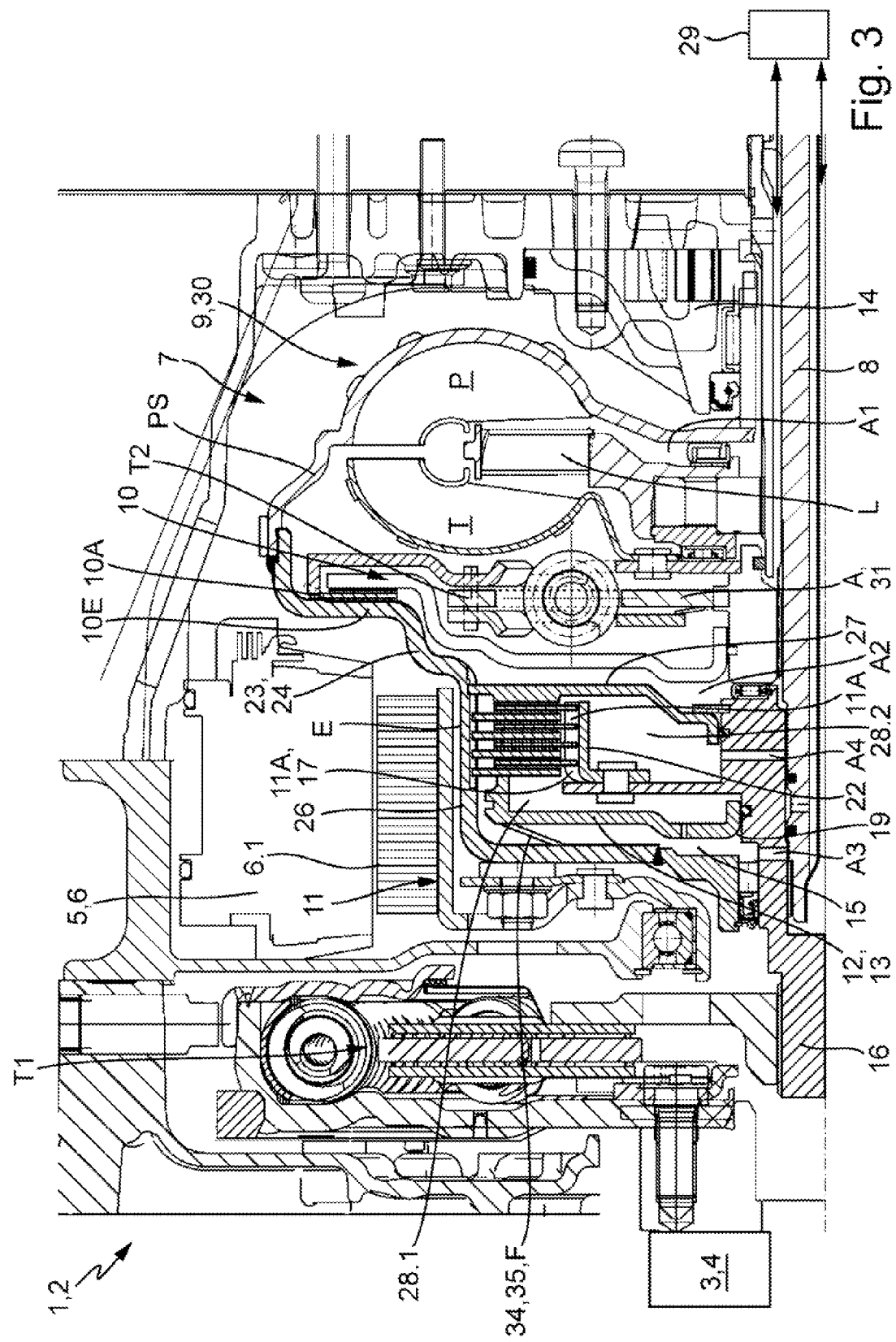

FIG. 3 in contrast clarifies a solution according to the invention. In this case, selectable clutch device 11 is formed as a pressure-less, connected clutch. This means that the hydraulic medium actuation of servo unit 12 preferably occurs only to open selectable clutch device 11, whereas, otherwise selectable clutch device 11, in particular both clutch parts 11E and 11A, are pressurized with an actuating force for a form- or force-closed connection, in particular frictional contact.

The design of power transmission device 7, selectable clutch device 11 as well as the linkages within combined power transmission and drive unit 1 correspond to the embodiment of servo unit 12, generating the actuating force described in FIG. 1 or 2, for the same elements, the same reference numbers are used and reference is drawn to these figures with regard to explanations for the design embodiment and function.

According to the invention, means 34 for transmission of a predefined torque to servo unit 12 of selectable clutch device 11 are provided between first engine 3 and power transmission unit 7, which are executed and disposed such that they are suitable to transmit full torque that can be developed by first engine 3, i.e., also maximum torque. Means 34 comprise particularly and advantageously selectable clutch device 11 with servo unit 12 and device 35 for developing preload on piston element 13, which corresponds to the actuating force of piston element 13 for transmitting the predefined engine torque. Piston element 13 is non-pressurized with hydraulic medium in the actuation direction to close selectable clutch device 11. Device 34 is executed as one of the following elements in dependence of disposition and direction of the force to be generated by one of the following elements: tension spring device, compressive spring device, and diaphragm spring device.

It is disposed between servo unit 12 and element of clutch parts 11E, 11A of selectable clutch device 11 or an element connected non-rotatably with the latter.

Spring unit F, with a pre-stressing force corresponding to the actuating force is disposed between second clutch part 11A or housing 26 and piston element 13. Piston element 13 acts on individual elements carrying and/or forming frictional surfaces of individual clutch parts 11E and 11A, wherein they are supported on wall element 27 for partitioning the pressure chamber between friction internal chamber 28 of selectable clutch device 11 and power transmission device 7. In this embodiment, piston element 13 is guided in the axial direction in a slidable manner on first and second clutch parts 11E and 11A, wherein piston chamber 15 is thereby formed between the latter. Piston element 13 is preferably connected non-rotatably with second clutch part 11A and guided only pressure-tightly on first clutch part 11E. It is also possible to provide the pressure-tight guidance only on second clutch part 11A and the non-rotatable coupling with first clutch part 11E. In this way, first clutch part 11E is connected non-rotatably with piston hub 16, which again is coupled with first engine 3 non-rotatably by means of device T1 for damping vibrations.

First clutch part 11E comprises inner disc carrier 22 as well as elements that carry and/or form a frictional surface that is guided in a slidable manner in the axial direction. Second clutch part 11A comprises external disc carrier 17 that is connected non-rotatably with housing 26 or rather with housing bell 24 or it forms the latter with this integral assembly unit and the elements carrying and/or forming frictional surfaces are mounted in a slidable manner in the axial direction, wherein, at the same time, housing 26 with wall element 27 forms an axial stop surface that can be brought in active connection and the elements carrying and/or forming frictional surfaces. In addition, this embodiment is characterized by four connections. The design of power transmission device 7 corresponds to that described in FIGS. 1 and 2, the reason why, for the same elements, the same reference signs are used further for coupling individual components amongst themselves. Only the improvement of selectable clutch device 11 varies. Spring unit F thus provides a pre-stressing force, which always allows the transmission of a predefined element, wherein piston chamber 15 for actuation must not be pressurized with hydraulic medium. In this way, the torque required for driving pumping device 14 and hence also for dragging hydrodynamic component 9 or rather the elements coupled with the input of power transmission device 7. Connection A4 that is connected with friction internal chamber 28 essentially serves for cooling the elements carrying and/or forming frictional surfaces of individual clutch parts 11E, 11A in partial chamber 28.2 as well as for opening selectable clutch device 11, in that, piston element 13 in the open-end position counteracts the pre-stressing force of spring unit F. Connection A3 serves likewise for cooling and actuating during the open state, by means of a further coupling with the partial chamber 28.2.

Spring unit F is advantageously executed as a diaphragm spring. Other compression springs are, however, also possible depending on embodiment.

In all the above-mentioned embodiments, in the emergency operation of selectable clutch device 11, closure and torque transmission takes place automatically or by means of an actuating force already applied by means of a mechanical device, in particular a pre-stressing force. A depicted embodiment of individual components is an example. This clarifies only the basic principle on the one hand, of the position of the selectable clutch device that is closed without pressure and an automatic closing function owing to a centrifugal oil pressure already adjusting due to the rotation of elements that form the appropriate pressure chamber.

REFERENCE NUMERALS AND DESIGNATIONS 1 combined power transmission and drive unit
2 hybrid system
3 first engine
4 internal combustion engine
5 second engine
6 electric machine
6.1 armature
7 power transmission device
8 transmission input shaft
9 hydrodynamic component
10 selectable clutch device
10E first clutch part
10A second clutch part
11 selectable clutch device
11E first clutch part
11A second clutch part
12 servo unit
13 piston element
14 pumping device
15 piston chamber capable of being pressurized
16 piston hub
17 external disc carrier
18 external circumference
19 internal circumference
20 first sealing device
21 second sealing device
22 inner disc carrier
23 housing
24 housing bell
25 interstice
26 housing
27 wall element
28 friction internal chamber
28.1 partial chamber
28.2 partial chamber
29 operating medium supply and guidance element
30 start-up element
31 hub
32 branch
33 device for developing a preload
34 means
35 device for developing a preload
A1 connection
A2 connection
A3 connection
A4 connection
E input
A output
P impeller
T turbine wheel
L stator
F spring unit
T1 device for damping vibrations
T2 device for damping vibrations

What we claim is:

1. A combined power transmission and drive unit (1) for an application in hybrid systems (2) between at least a first engine (3) and an element to be driven, with a power transmission device (7) featuring or forming a start-up element (30) and an upstream-disposed, selectable clutch device (11) for selective disconnection/connection of the power flow between the first engine (3) and the power transmission device (7), comprising a first clutch part (11E) connectable with the first engine (3) and a second clutch part (11A) connected with an input (E) of the power transmission device (7), which can be actuated at least partially by a servo unit (12) activated hydraulic medium with at least a piston element (13) and a piston chamber (15) associated with the piston element (13) and that can be pressurized with hydraulic medium, wherein the piston chamber (15) pressurized with the hydraulic medium is disposed and executed such that the hydraulic medium rotates with the rotation speed of the first clutch part (11E) or of an element connected non-rotatably with the first clutch part and wherein between the piston element (13) and the first clutch part (11 E) or an element connected non-rotatably with the first clutch part, a device (33) for developing a pre-stressing force is disposed.

2. The combined power transmission and drive unit (1) recited in claim 1, wherein the piston chamber (15) pressurized with the hydraulic medium is connected non-rotatably with the first clutch part (11E).

3. The combined power transmission and drive unit (1) recited in claim 1, wherein the piston chamber (15) pressurized with hydraulic medium is formed by the piston element (13) and the first clutch part (11E), wherein the piston element (13) is supported on the first clutch part (11E) or on an element connected non-rotatably with the first clutch part in a slidable manner in the axial direction and pressure- and liquid-tightly.

4. The combined power transmission and drive unit (1) recited in claim 3 wherein the piston element (13) in circumferential direction is connected non-rotatably with the first clutch part (11 E) or with an element connected non-rotatably with the first clutch part.

5. The combined power transmission and drive unit (1) recited in claim 1, wherein the first or second clutch part (11E, 11A) of the selectable clutch device (11) respectively comprises at least a carrier and at least a frictional surface carrying or forming element connected non-rotatably with the carrier and supported in a slidable manner in the axial direction.

6. The combined power transmission and drive unit (1) recited in claim 1, wherein the selectable clutch device (11) and the power transmission device (7) are disposed in an internal chamber that is enclosed by a housing bell (24).

7. The combined power transmission and drive unit (1) recited in claim 1, wherein the device (33) comprises at least a spring unit (F), in particular a compression spring or a diaphragm spring, which is hung form-closed in the axial direction between the first clutch part (11 E) or an element connected non-rotatably with the first clutch part and the piston element (13).

8. The combined power transmission and drive unit (1) recited in claim 1, wherein the piston element (13) and the piston chamber (15) pressurized with the hydraulic medium associated with the piston element (13) are executed and dimensioned such that in the presence of minimum filling of operating medium, at a predefined rotation speed of the first clutch part (11E), the same is suitable for forming an operating medium ring rotating in unison, which exerts an actuating force on the piston element (13), which establishes torque-transmitting active connection between the individual clutch parts (11E, 11A).

9. The combined power transmission and drive unit (1) recited in claim 8, wherein the piston element (13) and the piston chamber (15) pressurized with the hydraulic medium assigned to the piston element (13) are dimensioned such that the generated actuating force is suitable, at least to transmit a predefined minimum torque, which is sufficient to drive a pumping device (14) connected with the input (E) of the power transmission device (7), in particular a transmission oil pump.

10. The combined power transmission and drive unit (1) recited in claim 1, wherein the piston chamber (15) pressurized with hydraulic medium is formed by the piston element (13) and the first clutch part (11E), wherein the piston element (13) is supported on the first clutch part (11E) and on an element connected non-rotatably with the first clutch part in a slidable manner in the axial direction and pressure- and liquid-tightly.

11. The combined power transmission and drive unit (1) recited in claim 1, wherein the first or second clutch part (11E, 11A) of the selectable clutch device (11) respectively comprises at least a carrier and at least a frictional surface carrying and forming element connected non-rotatably with the carrier and supported in a slidable manner in the axial direction.

12. A combined power transmission and drive unit (1) for an application in hybrid systems (2) between at least a first engine (3) and an element to be driven, with a power transmission device (7) featuring or forming a start-up element (30) and an upstream-disposed, selectable clutch device (11) for selective disconnection/connection of the power flow between the first engine (3) and the power transmission device (7), comprising a first clutch part (11E) connectable with the first engine (3) and a second clutch part (11A) connected with an input (E) of the power transmission device (7), which can be actuated at least partially by a servo unit (12) actuated with hydraulic-medium with at least a piston element (13), wherein, a means (34) for transmission of predefined torque between the first engine (3) and the power transmission unit (7) are provided, which are executed and disposed such that they are suitable to transmit full torque that can be developed by the first engine (3) and wherein the means (34) comprise the selectable clutch device (11) with the servo unit (12) and a device (35) for preloading the piston element (13), which corresponds to the actuating force of the piston element for transmission of the predefined engine torque.

13. The combined power transmission and drive unit (1) recited in claim 12, wherein the device (34), which in dependence upon disposition and direction of the force to be generated, is selected from the group consisting of tension spring device, compression spring device, and diaphragm spring device, and disposed between the servo unit (12), and an element of the first or second clutch parts (11E, 11A) of the selectable clutch device (11) or an element connected non-rotatably with the first or second clutch parts.

14. The combined power transmission and drive unit (1) recited in claim 12, wherein the piston element (13) for opening the selectable clutch device (11) with an actuating force through the centrifugal oil pressure of the operating media ring rotating in unison in chamber (15) that can be pressurized with hydraulic medium or the devices (33, 35) for preload opposing the direction of force.

15. The combined power transmission and drive unit (1) recited in claim 14, wherein the force is generated hydraulically, in particular of the selectable clutch device (11) that can be pressurized with hydraulic medium in a friction internal chamber (28) inscribing the clutch surrounding.

16. The combined power transmission and drive unit (1) recited in claim 12, wherein the start-up element (30) is executed as a hydrodynamic component (9).

17. The combined power transmission and drive unit (1) recited in claim 16, wherein the power transmission device (7) comprises a device that at least partially surrounds the power flow system by means of the hydrodynamic component (9) executed as a selectable clutch device (10).

18. The combined power transmission and drive unit (1) recited in claim 12, wherein an armature (6.1) of a second engine (5) is supported on the input (E) of the power transmission device (7).

* * * * *